Inventors
Georges Rouyer
Michel Pilette
By
Karl W. Flocks
Attorney

United States Patent Office 3,458,684
Patented July 29, 1969

3,458,684
TUBULAR BODY WITH CORRUGATED WALL
Georges Rouyer and Michel Pilette, Chatillon-sous-Bagneux, Hauts-de-Seine, France, assignors to Nord-Aviation Societe Nationale de Constructions Aeronautiques, Paris, France, a corporation of France
Filed Sept. 6, 1966, Ser. No. 577,233
Claims priority, application France, Sept. 6, 1965, 30,568; Aug. 24, 1966, 74,056
Int. Cl. B23k *11/06*
U.S. Cl. 219—81                    5 Claims

ABSTRACT OF THE DISCLOSURE

Apparatus for helically-winding and welding strip material in overlapping reinforcing relationship as a tube on elongated base element corresponding to the shape being wound, and controlling the tangential angle application of the strip material in relation to variations in the distance between the outer surface of the base element and its longitudinal axis about which the strip material is being wound and/or as the tubular cross sections of the base element vary.

---

The object of this invention is a tubular body with an endless corrugated wall, and more particularly, a method for obtaining thin sheet metal tubular members whose outer surface can be considered as defined by a sinuous generating line describing a closed curve.

Metal members of this type are in demand in various fields, for example, in certain physics apparatus which should simultaneously be absolutely air-tight when evacuated, have great dimensional precision and a sufficient mechanical resistance to resist the effects of exterior pressure; they should nonetheless be as small as possible.

The present invention provides apparatus in which standard materials are used and the equipment is relatively simple and strongly built.

More specifically, an object of the present invention is to provide apparatus for storing preformed profiled continuous strip material, means for positioning the strip material in such a manner that it may be unwound continuously; means for continuously winding the profiled strip material under tension on a forming die and applying it in a helical pattern and in an optimum position on the edge of an adjacent helices; while winding the helical pattern in a tubular form, rigidly insuring conformation of the tubular helices to the cross sectional configuration of an underlying base element which has a non-circular cross section; securing the helices to the thin casing and securing adjacent helices to each other.

Other characteristics and advantages of the invention will be brought out from the description which follows, with reference to the accompanying drawings, and giving by way of example and without limitation one form of embodiment of the invention.

Figure 1:
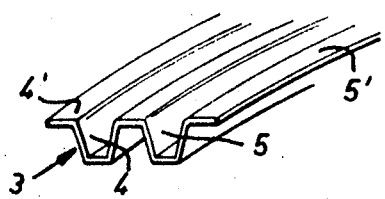
FIGURE 1 is a perspective view of a profiled strip used in the invention.
Figure 6:
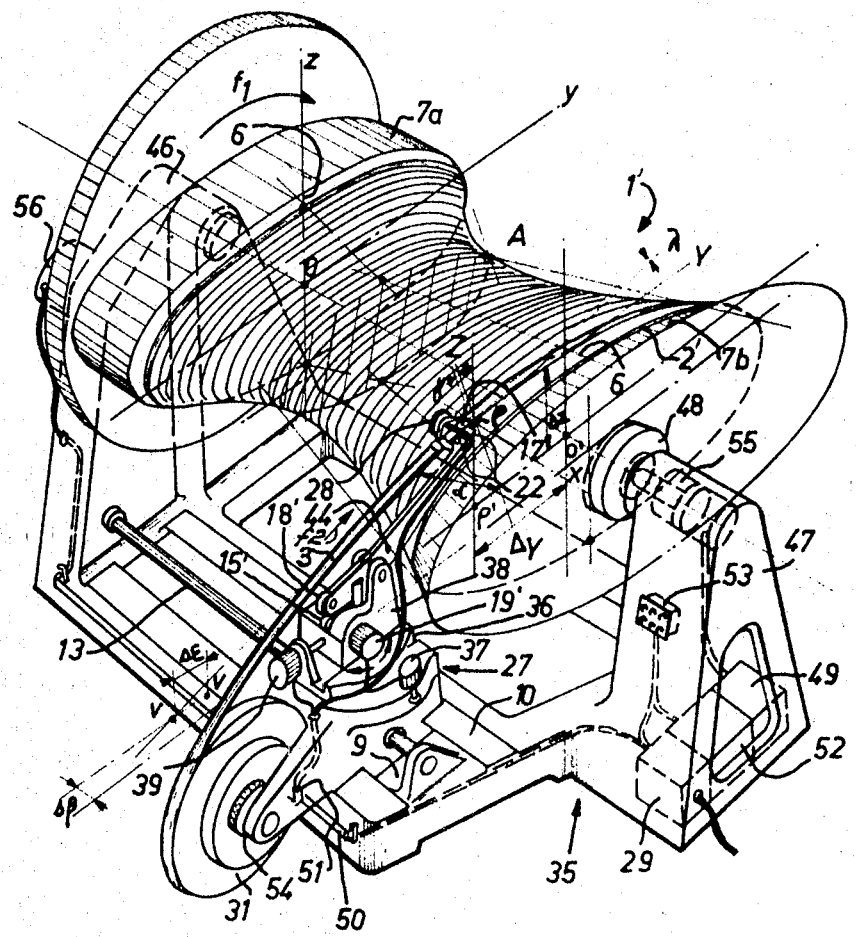
Figure 7:
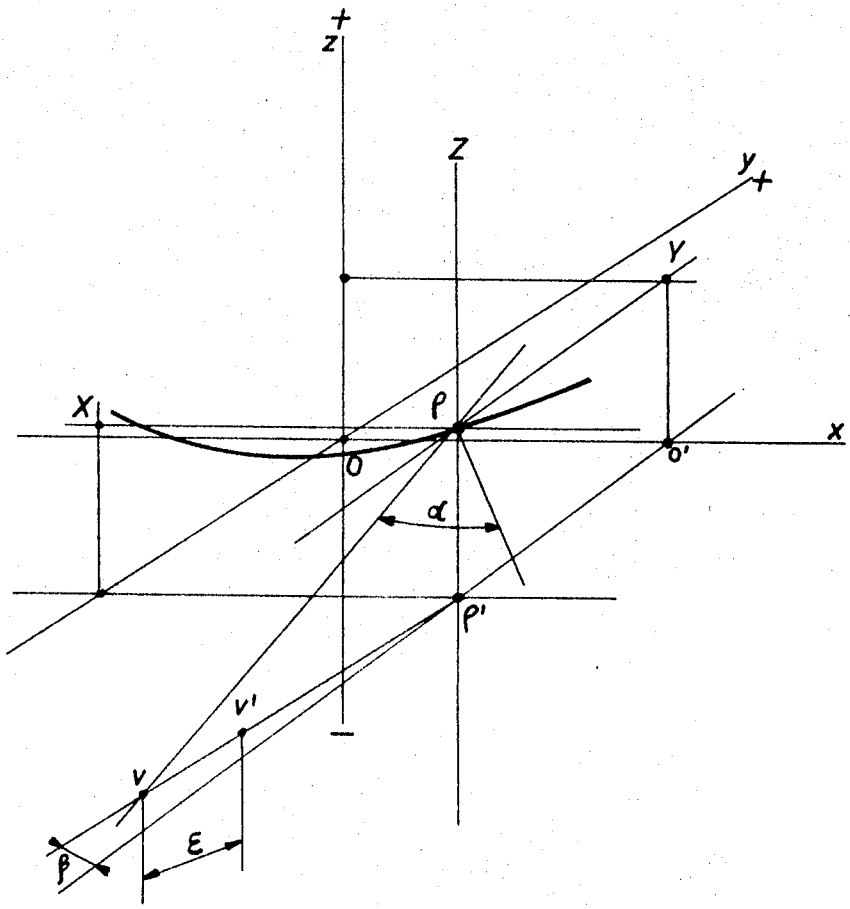
Figure 8:
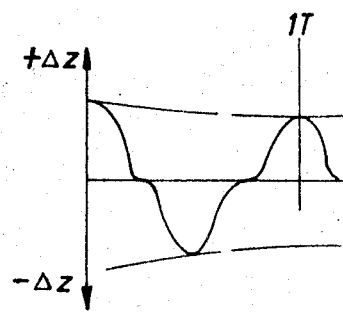
Figure 9:
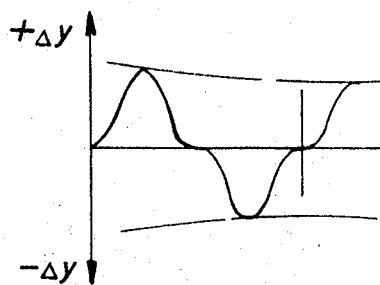
Figure 10:
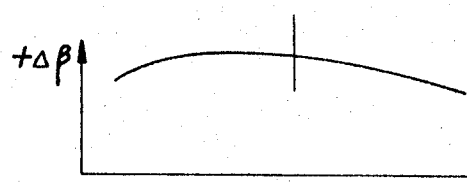
Figure 11:
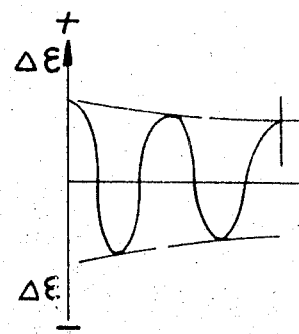

FIGURE 6 is a perspective view of another embodiment of the apparatus for the manufacture of a tubular body having approximately the shape of a single nappe hyperboloid with elliptical bases, for forming a converging-diverging air channel with its shaping die, a smooth inner jacket, a conformation block and a continuous seam welding device, the outer corrugated wall being in the process of shaping;

FIGURE 7 shows the co-ordinates of the position in space of the point of tangency in connection with the members of the machine of FIGURE 1; and FIGURES 8, 9, 10 and 11 are curves showing the laws of movement of the point of tangency during the winding step of the machine on its die.

Figure 2:
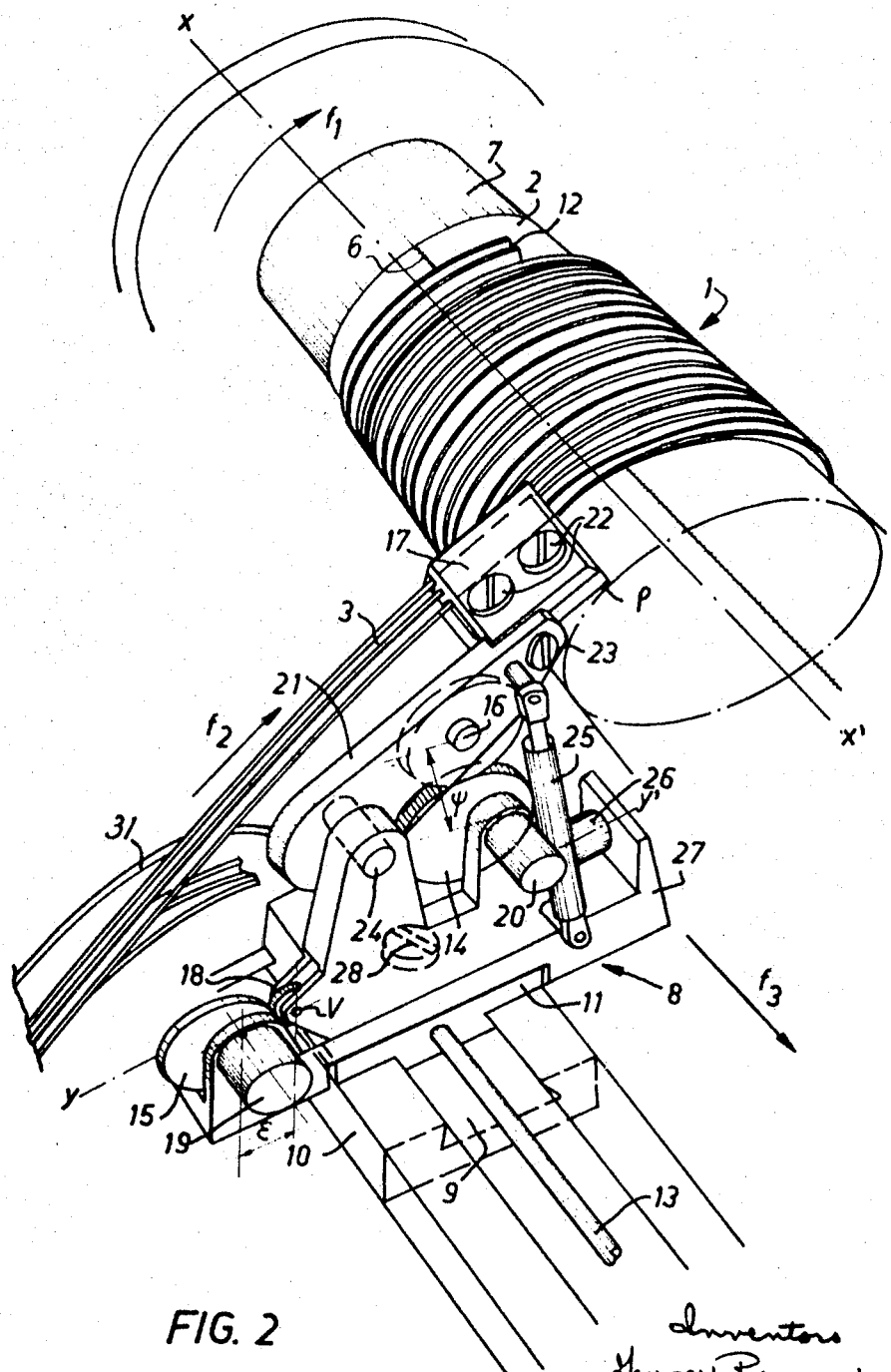
FIGURE 2 is a perspective view of a strip winding apparatus according to the invention.

FIG. 2 shows a tubular member, referred to generally by 1, of elliptical section with a long axis of 120 mm., a short axis of 60 mm. and a length of 3 meters, adapted to form a large vacuum chamber, air-tight under a vacuum of $10^{-5}$ torr at which it is capable of resisting atmospheric pressure without noteworthy deformation. This member 1 is made from a 0.1 mm. thick casing or jacket 2 and a profiled strip 3 obtained from a 0.1 mm. thick strip, casing 2 and strip 3 being formed from a sheet of high resistance ($R=140$ Hb) a magnetic stainless steel. Casing 2 is a preformed butt welded sheet and strip 3 is continuously profiled to a section having, for instance, two channels 4 and 5 (FIG. 1) 2 mm. in height and with a pitch of 4 mm.

Strip 3 is wound on a delivery reel 31 and casing 2 (the welded edges of which are visible at 6) is positioned on a shaping die 7 which rotates about its axis of symmetry $xx'$ in the direction of arrow $f_1$.

A forming and guiding block shown generally at 8 is carried by a carriage 27 which is movable in the slot 9 of a slide 10 connected to the frame (not shown) of a machine such as a horizontal lathe, for instance. The general direction of slide 10 is parallel to axis $xx'$. The support 11 of the carriage 27 moves in the direction of arrow $f_3$, the movement being so adjusted that the strip, which has initially been secured at 12 to the casing 2 and driven in the direction of arrow $f_2$, is helically applied to the die 7, each outer edge 4' of the channel 4 of a turn overlying the outer edge 5' of the channel 5 of the preceding turn.

The travel of the support 11 by rotation of the die 7 can be controlled by the movement of a driving screw 13 connected to the slide 10, so that the helical pitch of the winding is, for instance, double the pitch of a channel 4.

In as far as satisfactory application of the strip 3 to the sheet metal casing 2 is concerned, this strip should conform by elongation of the outer fibres and be pressed intimately against the sheet metal so as to take up the exact shape of the die 7, which can be of any shape. To obtain this intimate union, as a function of the mechanical properties of the strip 3 and whatever may be the shape of die 7, cams 14 and 15, whose operation is explained hereinafter are provided.

Figure 3:
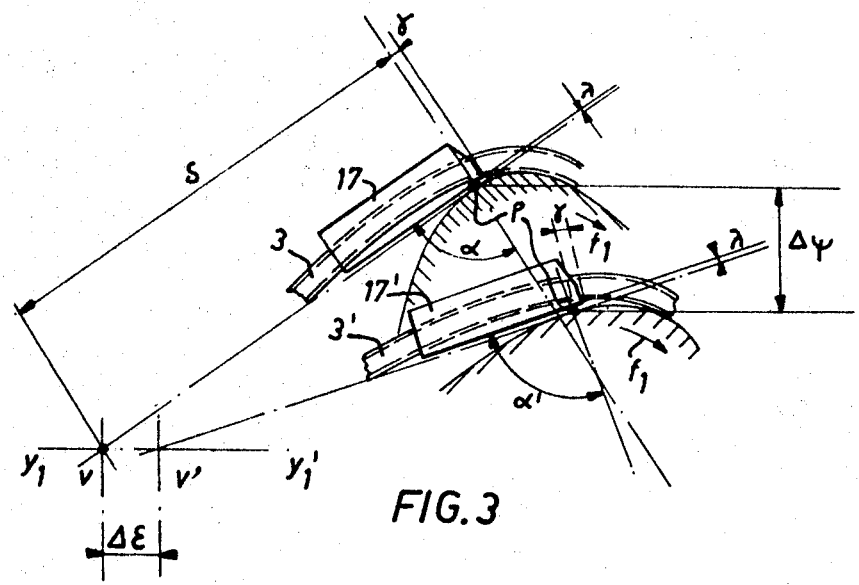
FIGURE 3 is a diagram showing the conformation of the strip.

FIG. 3 shows a conformator or guide 17 at the end of a guide bearing arm 21 (see FIG. 2) which presents strip 3 under tension at the moment it is applied to the die at two different moments of rotation of same in the direction $f_1$.

In order for the strip to be applied regularly, parameters "$\gamma$," "$\lambda$," and "$\alpha$" which condition the conformation of the strip and which relate to the position of the conformator or guide on the die, should not vary during rotation of the die although, in relation to the frame of the machine, the point of tangency "$\rho$" of the conformator bearing-arm $VV'$ moves in space. To achieve this, the ideal segment $V\rho$ of the conformator bearing-arm should also be driven about the centre of rotation of the die and the position of point V is controlled by the cam 15 and the position of point "$\rho$" is controlled by cam 14.

FIG. 2 shows how cam 15 acts, in a known manner, on the centre "V" of the roller 18 movable on the axis $yy'$: the variation of the distance between the axis of the motor of cam 19 and the axis of roller 18 varies proportionally to the movement Δε required by the geometry of the diagrammatic showing in FIGURE 3. Similarly, the distance σ between the axis of the motor of cam 20 and the centre of roller 14 varies proportionally to the movement required by the geometry of the diagrammatic showing in FIGURE 3. The distance δ of the arm remains fixed due to the design of the machine.

On the guide 17 can be seen clamp screws 22 which adjust the pressure of the jaws of said guide 17 on the profiled strip 3. The screw 23 connects the guide 17 to the arm 21, which pivots about an axis 24. A biasing device 25 ensures biasing of roller 16 on the cam 14 and a biasing device 26 ensures biasing of roller 18 on the cam 15.

A locking screw 28 permits the orientation of block 8 to be adjusted with respect to the support of the carriage 11 as a function of the pitch of the spiral winding of the strip 3 on die 7 i.e. the angular relationship of the strip to the axis of rotation of the metal casing 2 or the "lead" of the strip as it is angularly wound.

The speed of the cam motors 19 and 20 is regulated and synchronized with respect to that of the motor 56 which rotates the die 7 so that the rule explained hereinabove concerning the diagram of FIG. 3 is effected and that "γ," "λ" and "α" in the plane of FIGURE 3 normal to the generatrices at point "ρ" do not vary during winding of a given strip.

Figure 4:
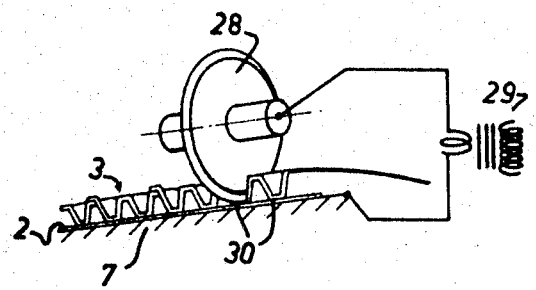
FIGURE 4 is a perspective view of a welding operation at the bottom of a rib.

FIGURE 4 shows how a resistance welding wheel 28, connected by means of a source 29 to die 7 for instance, can weld the bottom of the channel of strips 3 onto the casing or jacket 2; this operation can be carried out at the same time as the winding.

Figure 5:
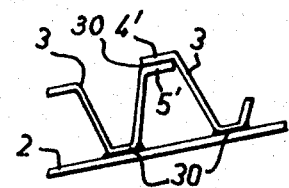
FIGURE 5 is a cross sectional view of a detail.

FIG. 5 shows a cross section of another example of secure connection of strips 3 to one another and to jacket 2 by brazing at 30.

In a more general sense, the tubular bodies of the present invention which comprise a mixed smooth/corrugated wall, may have their smooth wall either inside or outside according to the use to which they are to be put. Thus, according to a first embodiment, when the tubular body is to be placed in a liquid, it is preferable to have the smooth wall outside, while according to a second embodiment, when the tubular body is to be used as a fluid conduit or channel, it is preferable to have the smooth wall inside.

But if the tubular body is to form an enclosure or chamber subjected to internal or external pressure, it is clear that the position of the smooth wall is no longer of great importance and that considerations of convenience of manufacture, in conjunciton with the ease with which the means used in manufacture can be carried into practice, guide the choice of this position. It is immediately apparent that the fact of placing the smooth wall inside means that a contractable die does not have to be used during manufacture of the tubular body, which would be necessary if the said smooth wall were outside.

The present invention relates to a tubular body especially but not exclusively adapted to form conduits or enclosures subjected to internal or external pressure; this tubular body, with a smooth inner wall and a corrugated outer wall, is formed by winding a pre-corrugated strip onto a smooth wall bearing on a die of any shape whatsoever, or shaped in such a manner that its outer surface is, for instance, generated by a curved line, or in a general way, a line which is not parallel to the axis of symmetry of the die when it describes any closed curve.

The shape of this die may raise certain difficulties, to ensure that the strip is applied in a plane absolutely normal to the local tangential plane concerned. In the form of embodiment shown in FIG. 2, the plane of the strip guide is constantly perpendicular to the slide of the conformation and guiding block, which implies that the generatrices of the jacket wall are all substantially parallel to the said slide, but it can be otherwise. FIG. 6 shows a variant in which the die has approximately the form of a one nappe hyperboloid with elliptical bases, which poses certain problems when applying the band and taking down the assembly after the strip has been applied.

However, as will be seen hereinafter, the shape of this die is such that it does not pose special problems when it is taken down to remove it from the corrugations, as is the case in the prior art, in the forms of embodiment described in U.S. Patent Nos. 2,762,419; 2,786,435 and 3,067,707 for instance, which relates to a retractable die; the only problem is that of removing the die after shaping, as is done in the technique of snarling for instance.

The variant of FIG. 6 shows a shaping machine 35 equipped in a manner similar to that of a horizontal parallel copying lathe. It supports and drives both a die 7, in two parts 7a and 7b, an a profiled strip storing and conformation block 27. A jacket 2′ made of a smooth, preformed thin sheet metal is placed on the die 7. Synchronization of the movement of rotation and movement of the conformation block, which is obtained by a method described in greater detail hereinafter, permits, by conformation, guiding, application and assembly of a profiled metal strip 3 onto the said jacket, a rigid assembly 1′ to be obtained in its final state, and suitable for providing a channel forming a convergent-divergent tube for affording pressure variations as in a venturi tube, for example.

The arrangement of the machine members is naturally such that the parameters γ, λ and α which condition the conformation of strip 3 and define the position of the conformator or guide 17′ with respect to die 7, do not vary during rotation of the die, although with respect to the stationary frame the point of tangency "ρ" of the conformator or guide axis ending at V, and the orientation of the plane of application normal to the plane of tangency at "ρ" move in space.

In FI. 7, the point "ρ" is located in space by co-ordinates ρX, ρY and ρZ, these co-ordinates having parallel movements with respect to corresponding co-ordinates $o_x$, $o_y$ and $o_z$. The elongation curves of ΔY, ΔZ, Δε, and Δβ with respect of OO′ in FIGURES 8, 9, 10 and 11 enable the variations of ρ to be defined with respect to planes O, Y, O′ and O, O′, ρ′ as well as the variations $\Delta\epsilon = \overrightarrow{VV}$ of ρ V and the variations of ρ, V, ρ′ with respect to plane ρ, ρ′, O′.

These movements ΔY, ΔZ, Δε and Δβ which depend on the position of point ρ and impose the correct position of the conformator guide 17 with respect to die 7 in all the sucessive positions of point ρ may be obtained in this variant by improved means with respect to those used in the form of embodiment of FIGURE 7. It is thus possible to produce, in known manner, these movements from a conformation block 27 which moves parallel to axis Ox in the slot 9 of the slide 10 by means of a lead-screw 13, the said block supporting in turn a plate 36 which pivots about an axis parallel to Oz, and which is controlled by a servo-motor 37. A slide carriage 38, controlled by a servo-motor 39 driving a screw 40 moves on the plate 36 about a horizontal axis parallel to Vρ′ for instance. Finally a last servo-motor 19′ controls, by means of a cam 15′ and a roller 18′, an arm 21 which pivots about an axis connected to the carriage 38 perpendicular to plane Vρρ′ and which receives at its free end the conformator 17 whose slope is adjustable by screws 22. Furthermore, a biasing system of any known type 25 maintains the roller 18′ permanently on cam 15 and a real 31, integral with the conformation block contains, tightens and discharges the profiled strip 3.

The shaping machine 35 is furthermore provided with a welding wheel 28 mounted on a pressure control device of any type (not shown) integral with the conformator 17, which continuously resistance-welds the profiled band 3 to jacket 2′ so that the point where welding is performed is offset with respect to the application point of the guide by exactly one rotation of die 7. The die 7 is divided into two parts 7a and 7b assembled by a suitable means (not shown) according to the narrow cross section A to permit of its being taken down easily after winding; it is aligned between headstock 46 and tailstock 47, then placed in position and under pressure by a tailstock type system 48 provided with a jack 55 fed by a pump 49 and driven in direction $f_1$ by the motor 56 integral with a gear train (not shown) disposed in the headstock 46; the supply of electricity to the motor and the welding wheel is ensured from a terminal 50 and a brush 51 from a welding transformer 29 and a unit 52 regulating the variation in speed of the motors, and controlled by a general control box 53; the lead-screw 13 is driven by a motor integral with a gear box (not shown) and the tension of the strip 3 is adjusted at will by the button 54 disposed on the reel 31.

Movements of point "$\rho$," whose spatial co-ordinates are shown in FIG. 7, can be transcribed by curves which can supply the necessary indications for correctly adjusting the speed of the motors 37, 39 and 41. Thus, if the variations of parameters "$z$" and "$y$" are considered as respectively representing the position of "$\rho$" with respect to plane $xoy$ presumed to be horizontal and with respect to plane $zox$ presumed to be vertical, the variations of "$\beta$" representing the angle formed by plane $\rho V \rho'$ with plane $\rho \rho' O'$ parallel to $z, o, y$ and the prolongation "$\epsilon$" representing the movement in plane $x, o, y$ of point V which materializes the intersection of the tangent at "$\rho$" with said plane, it is possible, as shown in FIGURES 8, 9, 10 and 11 (by way of example and for one rotation 1T only) to define the corresponding variations in direction, sense and magnitude of values $\Delta z, \Delta y, \beta$ and $\epsilon$. It is easily understood that, as these curves can be predetermined as a function of the shape of the tubular body to be made, it is then possible, with the electrical information deduced from the said curves, to provide the motors with suitable speed rules for each individual case.

According to a variant in the positioning means of the conformator and the welder, the said members may be controlled by a numerical control (point by point, or continuous) with an indeterminate number of axes.

It is understood that the present invention has been described above purely by way of explanation and not in any way a limitative sense, and that any alterations of detail within its spirit can be made without thereby departing from its scope.

We claim:

1. Apparatus for helically-winding a continuous strip onto an elongated base element comprising, in combination:

power means for supporting and rotating a base element about its longitudinal axis;

a support member supported for movement in a path parallel to said axis of rotation;

means for supplying a continuous strip of material to be helically wrapped onto the base element;

power means connected to said support member for moving it in parallel relation to the axis of rotation of the base member to be wrapped;

the improvement wherein:

said support member includes a carriage movable toward and away from the axis of rotation of the base element and transversely relative to the path of travel of said support member;

a support arm pivotally mounted on said carriage in a path of movement in a plane normal to the path of movement of said support member;

said support arm including a terminal clamp and guide element for clamping the strip material to be helically wound about the base element and imposing a residual tension in the strip as it is being wound;

power means operatively connected to said carriage and arm for moving the same in the respective paths of movement in relation to the support member and outer surface of the base element being wrapped for orienting the strip in relation to an optimum point of tangency on the outer surface of the base element where the strip is being applied; and control means operatively connected between respective power and support arm and said carriage for orienting the terminal clamp element in two independent planes of adjustment in relation to the surface of configuration of the base element.

2. Apparatus claimed in claim 1 including means for adjusting said carriage about a vertical pivotal axis for orienting said clamp member in an angular pitch relationship with respect to the axis of rotation of said base element to determine the side marginal overlap of adjacent helices of the strip element being helically wound about the base element.

3. The structure as claimed in claim 1 in which said control means comprise non-circular cam elements which are constructed and arranged in relation to the cross sectional area of the base element being wrapped whereby the strip material is tangentially applied to a base element having an elliptical cross section.

4. The structure as claimed in claim 1 in which said clamp and guide element has adjustably mounted adjacent thereto welding means for progressively welding adjacent helices of the helically wound strip material as it is wound onto the base element.

5. Apparatus as claimed in claim 1 in which said base element has an elliptical cross section and is hyperbolic when viewed in elevation, said control means comprising means for moving the carriage in two directions of movement one of which comprises pivotal movement about a vertical axis and the other of which comprises transverse movement normal to the path of travel of said support member, another means for pivoting said support arm, and independent power means for automatically and independently affording each of said movements.

References Cited

UNITED STATES PATENTS

| | | | |
|---|---|---|---|
| 2,351,152 | 6/1944 | Schick | 219—62 X |
| 2,376,762 | 5/1945 | Ferguson | 219—62 X |
| 3,359,402 | 12/1967 | Riepel | 219—107 X |

JOSEPH V. TRUHE, Primary Examiner

B. A. STEIN, Assistant Examiner

U.S. Cl. X.R.

219—107; 228—5